US007009950B1

(12) United States Patent
Hirata et al.

(10) Patent No.: US 7,009,950 B1
(45) Date of Patent: Mar. 7, 2006

(54) MOBILE IP NETWORK SYSTEM AND CONNECTION SWITCHING METHOD

(75) Inventors: Tetsuhiko Hirata, Yokohama (JP); Masashi Yano, Fujisawa (JP); Norihisa Matsumoto, Kawasaki (JP); Susumu Matsui, Machida (JP); Shoji Fukuzawa, Fujisawa (JP); Atsushi Teshima, Yokohama (JP); Mika Mizutani, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 09/624,072

(22) Filed: Jul. 24, 2000

(30) Foreign Application Priority Data

Jul. 22, 1999 (JP) ................................ 11-207223

(51) Int. Cl.
*H04Q 7/00* (2006.01)

(52) U.S. Cl. ....................... 370/331; 370/338; 370/352

(58) Field of Classification Search ................ 370/328, 370/338, 912, 395.5, 493, 352, 902, 436–440, 370/435.1, 433, 443, 331–334, 341, 560; 455/436–440, 435.1, 433, 442, 560, 445, 455/568

See application file for complete search history.

(56) References Cited

U.S. PATENT DOCUMENTS

| | | | | |
|---|---|---|---|---|
| 5,471,644 A * | 11/1995 | Schatz et al. | 455/436 |
| 5,682,416 A * | 10/1997 | Schmidt et al. | 455/436 |
| 5,708,655 A * | 1/1998 | Toth et al. | 370/313 |
| 5,862,345 A * | 1/1999 | Okanoue et al. | 709/238 |
| 5,949,773 A * | 9/1999 | Bhalla et al. | 370/331 |
| 5,953,668 A * | 9/1999 | Reilly | 455/442 |
| 5,958,018 A * | 9/1999 | Eng et al. | 709/246 |
| 6,023,461 A * | 2/2000 | Raychaudhuri et al. | 370/331 |
| 6,078,575 A * | 6/2000 | Dommety et al. | 370/338 |
| 6,215,779 B1 * | 4/2001 | Bender et al. | 370/338 |
| 6,233,458 B1 * | 5/2001 | Haumont et al. | 455/445 |
| 6,240,089 B1 * | 5/2001 | Okanoue et al. | 370/390 |
| 6,272,129 B1 * | 8/2001 | Dynarski et al. | 370/356 |
| 6,366,561 B1 * | 4/2002 | Bender | 370/238 |
| 6,385,451 B1 * | 5/2002 | Kalliokulju et al. | 455/437 |

(Continued)

FOREIGN PATENT DOCUMENTS

| | | |
|---|---|---|
| JP | 11075245 | 3/1999 |
| JP | 11103320 | 4/1999 |
| JP | 11252182 | 9/1999 |

OTHER PUBLICATIONS

C. Perkins, "IP Mobility Support" RFC2002, Oct. 1996.
T. Hiller, "Wireless IP Network Architecture base on IETF Protocols", Victoria, BC, May 17-21, 1999.

*Primary Examiner*—Chau Nguyen
*Assistant Examiner*—Ian N. Moore
(74) *Attorney, Agent, or Firm*—Mattingly, Stanger, Malur & Brundidge, P.C.

(57) ABSTRACT

In a mobile IP network system containing a plurality of radio access networks 2 for connecting with mobile stations 1 via radio links and an IP network 102 connected with a plurality of packet nodes for transferring IP packets, each of the radio access networks has at least one base station controller 7 and at least one radio base station 6 connected to the base station controller. Each of the base station controllers 7 in the radio access network is connected to the plurality of packet nodes to each other via a network 104 and selects one of the plurality of packet nodes in accordance with a state of each mobile station to establish a logical connection to be used in IP packet communication of the mobile station.

10 Claims, 14 Drawing Sheets

U.S. PATENT DOCUMENTS

| | | | | |
|---|---|---|---|---|
| 6,404,754 | B1 * | 6/2002 | Lim | 370/338 |
| 8,487,406 | * | 11/2002 | Chang et al. | 455/422.1 |
| 6,535,493 | B1 * | 3/2003 | Lee et al. | 370/329 |
| 6,587,882 | B1 * | 7/2003 | Inoue et al. | 709/227 |
| 6,654,359 | B1 * | 11/2003 | La Porta et al. | 370/328 |
| 6,661,782 | B1 * | 12/2003 | Mustajarvi et al. | 370/331 |
| 6,724,739 | B1 * | 4/2004 | Tiedemann et al. | 370/331 |
| 2003/0039237 | A1 * | 2/2003 | Forslow | 370/352 |

* cited by examiner

LINK MANAGEMENT TABLE 203-3

| MOBILE STATION ID (301) | PACKET NODE IN CONNECTION (302) | DESIGNATED PACKET NODE (303) |
|---|---|---|
| ××× | 3A | 3B |
| | | |
| | | |

MOBILE IP NETWORK SYSTEM AND CONNECTION SWITCHING METHOD

BACKGROUND OF THE INVENTION

1. Field of the Invention

The present invention relates to a mobile IP network system and a connection switching method. More particularly, the invention relates to a technique of switching a logical connection for IP packet communications between a radio access network and a packet node connected to an IP (Internet Protocol) network in association with movement of a mobile station.

2. Description of the Related Art

In order to enable IP data to be transferred between a mobile station and a host connected to an IP network typified by the Internet, a network system in which a mobile communication network is connected to the IP network via a packet node having a foreign agent function in a mobile IP is being examined.

The mobile IP denotes a technique for enabling the communication between a mobile station and a host to be continued without changing an IP address even when the connection position between the mobile station and the IP network changes. In the mobile IP, a node having a home agent function for each of mobile stations is preliminarily determined. The home agent function denotes a function of grasping the current position of mobile stations under the control, when an IP packet destined for a mobile station under the control is received, converting the reception packet to an encapsulated packet destined for a packet node connected to a radio access network in which the mobile station is positioned at present, and transmitting the encapsulated packet to the IP network.

Each of packet nodes for receiving the encapsulated packet via the IP network has a foreign agent function. The foreign agent function denotes here a function of decapsulating the reception packet and transmitting the obtained IP packet to a radio access network in which a destination mobile station is positioned.

By the home agent function and the foreign agent function, even when a mobile station moves between radio access networks, an IP packet can be delivered to the mobile station without changing the IP address of a transmission packet.

In the following, a node having the home agent function will be called a home agent node and a node having the foreign agent function will be called a foreign agent node.

A communication between a mobile station and a host connected to an IP network is realized by switching a logical connection between the mobile station and a foreign agent node by using a position control function peculiar to a mobile communication network and routing an IP packet between the foreign agent node and the host by the mobile IP function.

The mobile IP is standardized by IETF and is described in, for example, "IP Mobility Support", C. Perkins, RFC2002, October 1996. A mobile IP data communication in IMT-2000 as a third-generation mobile communication network is described in "Wireless IP Network Architecture based on IETF Protocols", Tom Hiller, 1999 disclosed by TIA as a standardization organization in North America.

In the mobile IP, when a mobile station is moved from a control area of a packet node (foreign agent node) to a control area of another packet node, a registration procedure for switching the foreign agent node is necessary in the home agent node.

The mobile station notifies the home agent node of a destination packet node and the home agent node registers the destination packet node as a new foreign agent for the mobile station. Consequently, the home agent node can transfer an IP packet destined for the mobile station received after that to the new foreign agent (packet node on the destination side).

The conventional technique has a problem such that it takes time from the request of the registration procedure to the response. Specifically, when a mobile station moves to a control area of another packet node and is handed over to a radio base station in the control area, until the registration is completed in the home agent node, IP packets destined for the mobile station are transferred from the home agent node to a packet node in the previous control area, so that the IP packets are not transferred to the mobile station. Although the dropped IP packets may be compensated by retransmission of the IP packets from the host in response to a request from the mobile station, when the amount of the dropped IP packets is large, a problem such that the retransmission of the IP packets severely deteriorates the throughput occurs.

SUMMARY OF THE INVENTION

It is an object of the invention to provide a mobile IP network system and a connection switching method in which dropout of an IP packet which occurs during a registration procedure of a destination packet node is prevented.

In order to achieve the object, the present invention is characterized in that each of base station controllers in a radio access network selectively establishes a logical connection or a logical link with a plurality of packet nodes each having a foreign agent function.

More specifically, a mobile IP network system of the invention comprises: a plurality of radio access networks each connected to a mobile station via a radio link; and an IP network to which a plurality of packet nodes for transferring an IP packet are connected, and is characterized in that a base station controller in each of the radio access networks is connected to the plurality of packet nodes, and each of the base station controllers selects one of the plurality of packet nodes in accordance with a state of each mobile station, and sets a logical connection to be used in IP packet communication of the mobile station.

In the network system according to the invention, when a mobile station is moved from a control area of another radio access network to the control area of one of the base station controllers, the base station controller can sets a logical connection for the mobile station with a previous packet node which has communicated with the mobile station in the control area of the another radio access network. That is, according to the invention, when a mobile station is moved from a radio access network to another radio access network, the IP packet communication can be continued without performing a registration procedure for switching a foreign agent node. Thus, the problem of the dropout of IP packets in association with the registration procedure can be solved.

Another characteristic of a mobile IP network system according to the invention is that each of the base station controllers has means for monitoring a transmitting and receiving state of data to and from a mobile station which has moved from the control area of another radio access network, detects that data transmission and reception of the mobile station is stopped, cancels the logical connection between the base station controller and the previous packet node, and sets a new logical connection for the mobile station between the base station controller and a preliminarily designated specific packet node.

When the packet node to be connected to the base station controller via the logical connection is switched, the registration procedure by the home agent node is necessary. According to the invention, however, since the registration procedure is performed during the data transmission and reception of the mobile terminal is stopped, the problem of the dropout does not occur.

The foregoing and other objects, advantages, manner of the operation and novel features of the present invention will be understood from the following detailed description when read in conjunction with the accompanying drawings.

DETAILED DESCRIPTION OF THE PREFERRED EMBODIMENTS

First, for easier understanding of the present invention, a conventional mobile IP network system will be described with reference to FIGS. 1 to 9.

Figure 1:
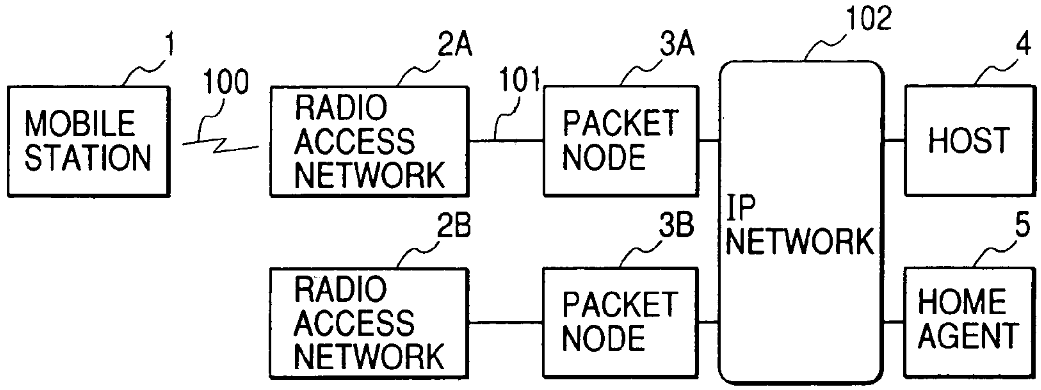
FIG. 1 is a diagram schematically showing the construction of a conventional mobile IP network system.

FIG. 1 shows a general construction of the conventional mobile IP network system.

The mobile IP network system comprises: a mobile station 1; a plurality of radio access networks 2 (2A, 2B, . . . ); packet nodes 3 (3A, 3B, . . . ) each for connecting each of the radio access networks to an IP network 102; a home agent node 5 of the mobile station 1; and a host (or server) for performing communications with the mobile station. The mobile station 1 and the radio access network 2 are connected via, for example, a radio link 100 using CDMA. The radio access network 2 and the packet node 3 are connected via a dedicated line 101. The host 4 and the home agent node 5 are connected to the IP network 102, and each of the packet nodes 3 has a foreign agent function in a mobile IP.

Figure 2:
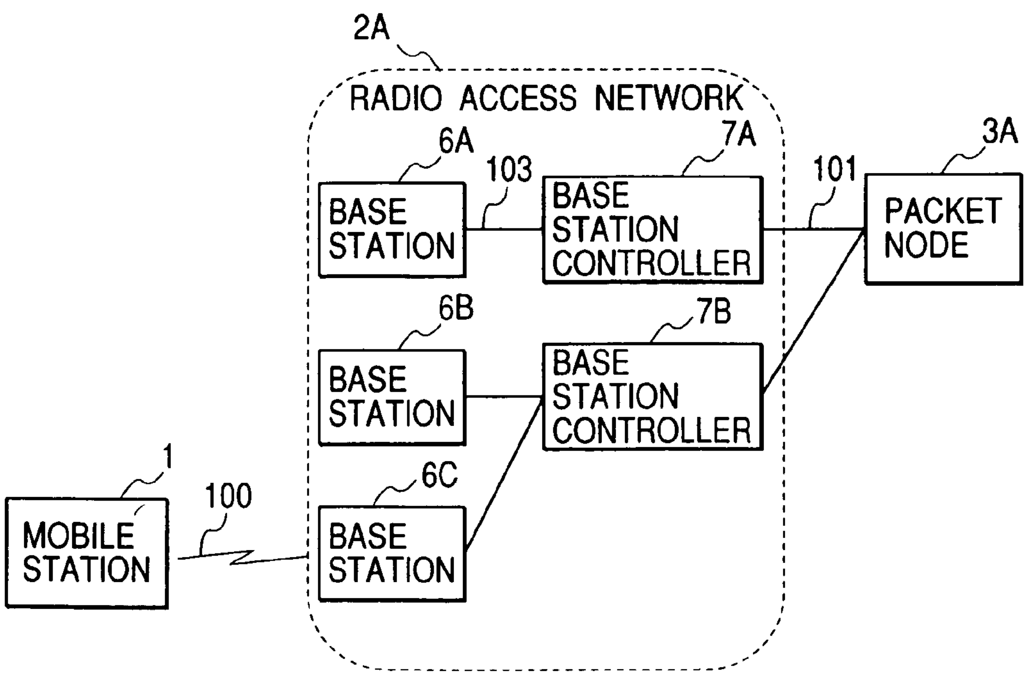
FIG. 2 is a diagram specifically showing a radio access network 2.

Each of the radio access networks 2 (2A, 2B, . . . ) comprises, for example as shown in FIG. 2, one or more base station controllers 7 (7A, 7B, . . . ) connected to the packet node 3 and one or more radio base stations 6 each connected to any of the base station controllers via a dedicated line 103. The packet node 3 and the base station controllers 7 have the connecting relation of 1 to m, and the base station controller 7 and the base stations 6 have the connecting relation of 1 to n. The functions of the base station controller 7 and the base station 6 may be collected in a single device called a radio access point.

Figure 3:
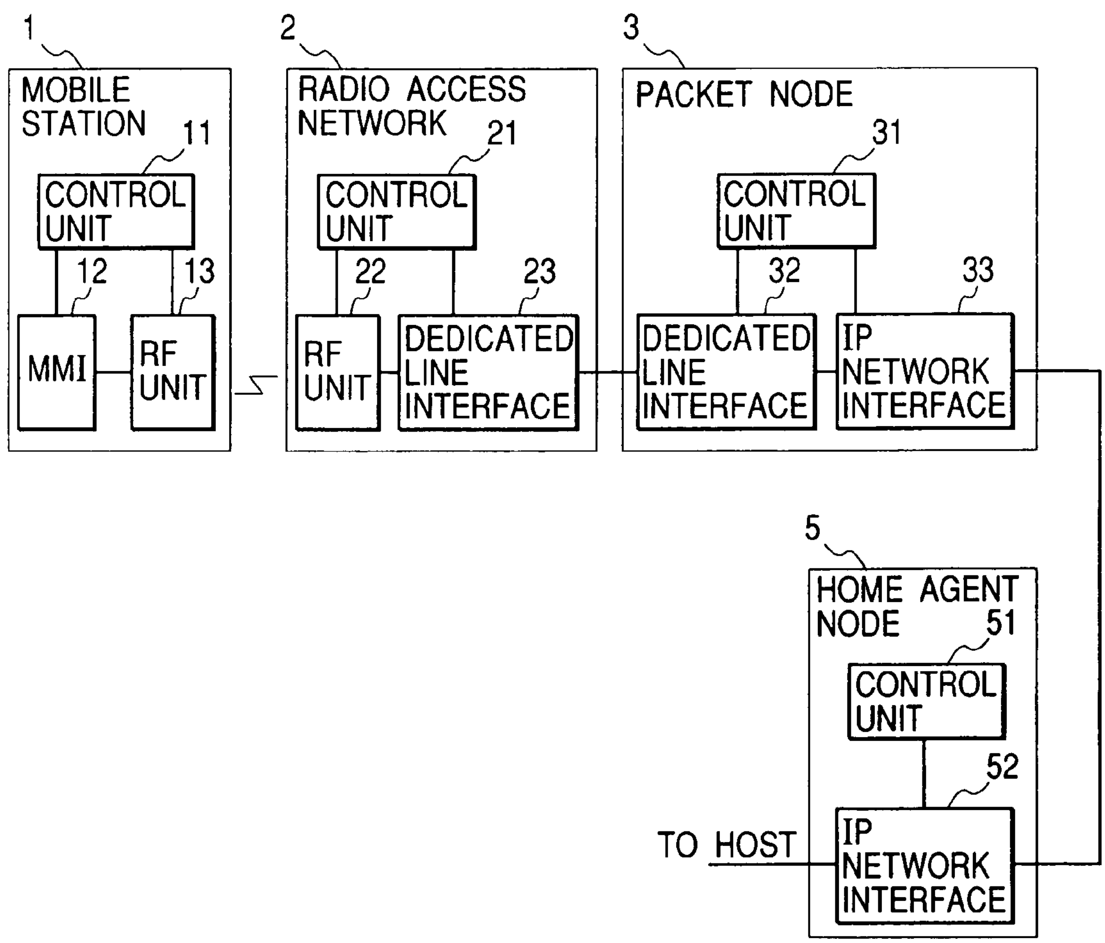
FIG. 3 is a diagram showing schematic constructions of a mobile station 1, a radio access network 2, a packet node 3, and a home agent node 5 in FIG. 1.

FIG. 3 shows schematic constructions of the mobile station 1, radio access network 2, packet node 3 and home agent node 5.

The mobile station 1 comprises: a man-machine interface (MMI) 12 including an external device interface function; a radio frequency unit (RF unit) 13 for communicating with the radio access network 2 through a radio channel; and a control unit 11 connected to those elements.

The radio access network 2 comprises: a radio frequency unit (RF unit) 22 for communicating with the mobile station 1 via a radio channel; a dedicated line interface (dedicated line control unit) 23 for communicating with the packet node 3; and a control unit 21 connected to those elements.

The packet node 3 comprises: one or more dedicated line interfaces 32 for communicating with the radio access network 2; an IP network interface 33 for a connection to an IP network; and a control unit 31 connected to those elements.

The home agent node 5 comprises an IP network interface 52 for a connection to the IP network and a control unit 51.

Figure 4:
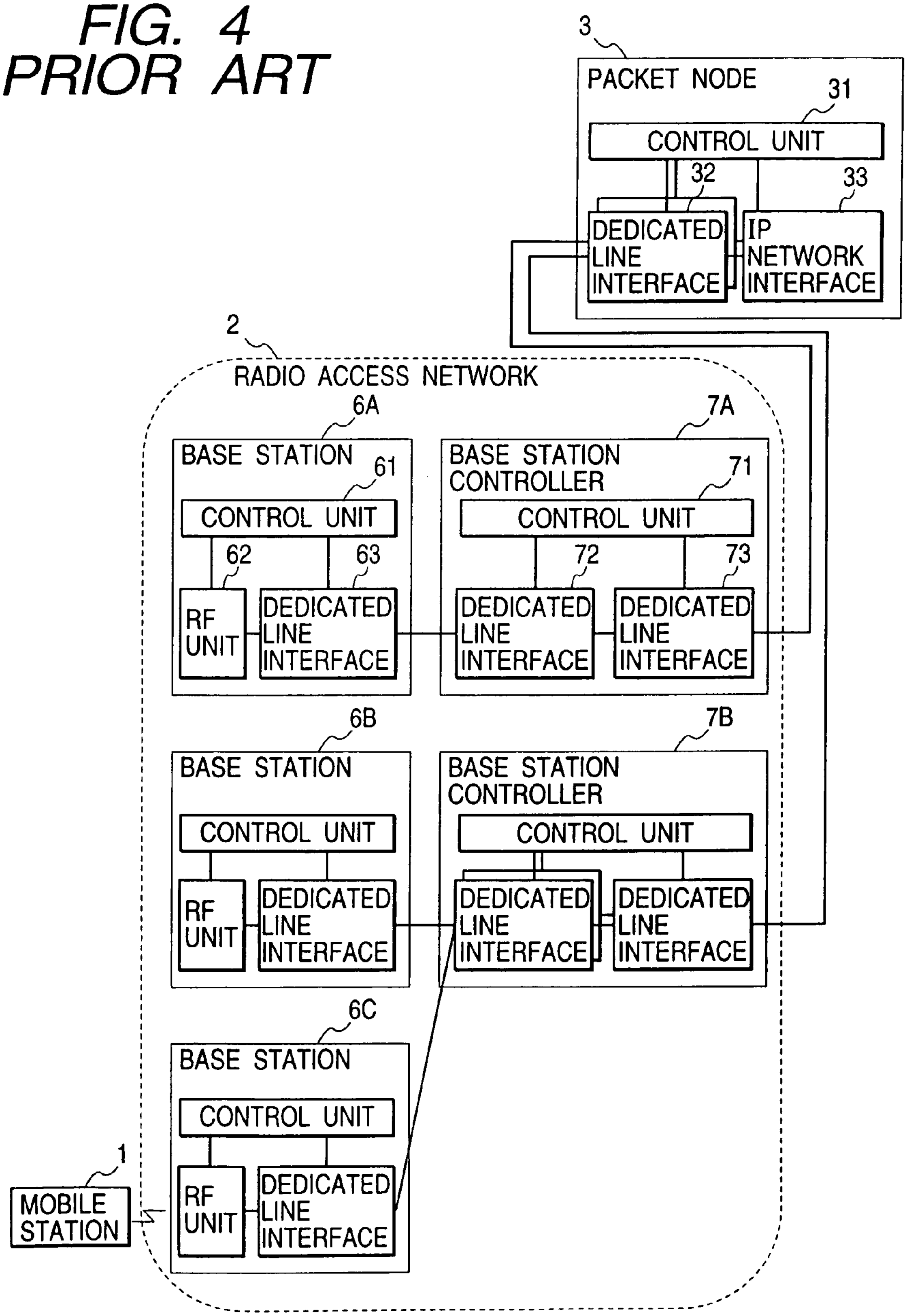
FIG. 4 is a diagram showing schematic constructions of base stations 6 and base station controllers 7 constructing the radio access network 2.

FIG. 4 shows an example of a specific construction of the radio access network 2.

The radio access network 2 comprises the one or more base station controllers 7 (7A, 7B, . . . ) and the plurality of base stations 6 (6A, 6B, 6C, . . . ) each connected to any of the base station controllers.

Each base station 6 comprises an RF unit 62 for communicating with the mobile station 1 via a radio channel; a dedicated line interface (dedicated line control unit) 63 for communicating with the base station controller 7; and a control unit 61 connected to those elements.

Each of the base station controllers 7 comprises one or more dedicated interfaces (dedicated line control units) 72 for communicating with the base station 6; a dedicated line interface (dedicated line control unit) 73 for communicating with the packet node 3; and a control unit 71 connected to those elements.

The RF unit 22 in the radio access network shown in FIG. 3 corresponds to the RF unit 62 in the base station 6, the dedicated line interface 23 corresponds to the dedicated line interface 73 in the base station control unit 7, and the control unit 21 corresponds to a combination of the control unit 61 in the base station and the control unit 71 in the base station controller.

Figure 5:
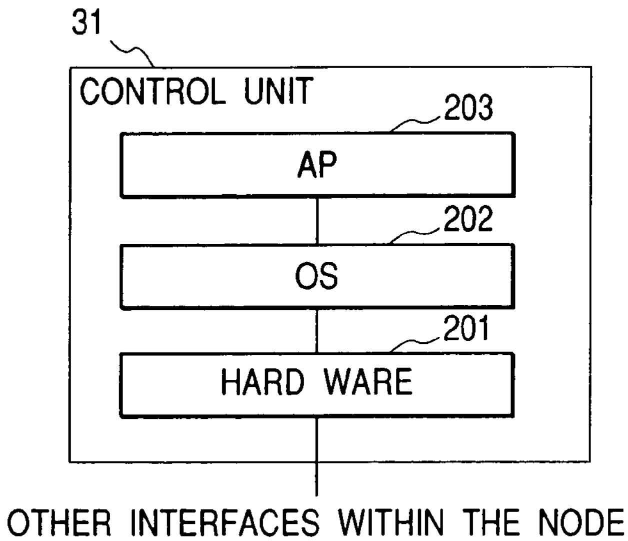
FIG. 5 is a diagram showing a schematic construction of a control unit 31 in the packet node 3.

FIG. 5 shows the construction of the control unit 31 in the packet node 3.

In the control unit 31, an OS 202 operates on hardware 201 comprising a CPU and a memory, and AP (application software) 203 which determines the behavior of a packet node operates under the control of the OS 202. Each of the control units in the mobile station 1, base station 6, base station controller 7 and home agent node 5 has basically the construction similar to that of the control unit 31.

Figure 6:
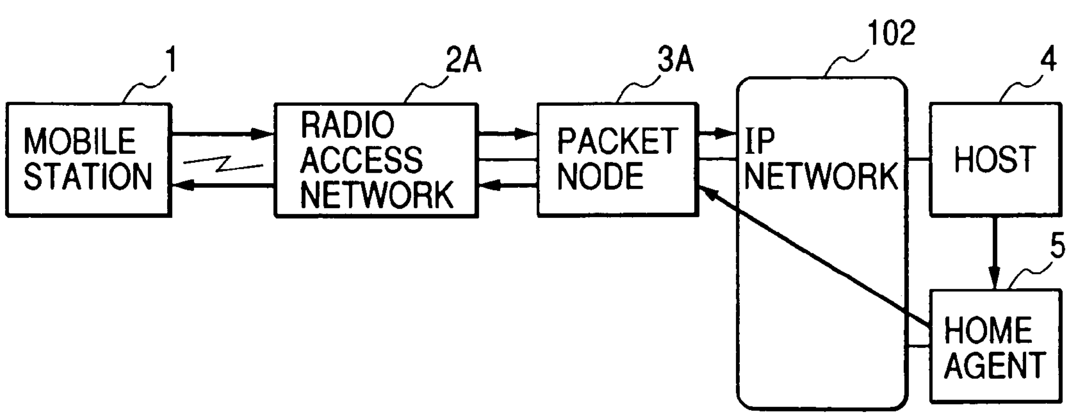
FIG. 6 is a diagram for explaining the flow of communication data between the mobile station 1 and the host 4 in the conventional mobile IP network system.

FIG. 6 shows the flow of communication data between the mobile station 1 and the host 4 in the conventional mobile IP network system.

The host 4 generates an IP packet including transmission data to the mobile station 1 and an IP address of the mobile station 1 and transmits the IP packet to the IP network 102. The IP packet is received by the home agent node 5 of the mobile station 1.

The home agent node 5 stores the corresponding relation between an IP address of each of mobile stations under the control and an IP address of each of packet nodes connected to the radio access network as a destination. The home agent node 5 obtains the IP address of the packet node 3A to which the reception packet is transferred on the basis of the IP address of the mobile station included in the reception packet from the host 4, adds (encapsulates) a new header in which the IP address of the packet node 3A is set as a destination address to the reception packet, and transmits the resultant to the IP network 102.

Each of the packet nodes 3 stores the corresponding relation between the IP address of each of the mobile stations connected to the radio access network under the control and an ID of a logical connection (Point to Point Protocol (PPP) connection) between the mobile station and the packet node itself. The packet node 3A removes or decapsulates the IP header from the encapsulated packet received from the home agent node 5, obtains a PPP connection ID corresponding to the mobile station on the basis of the IP address of the mobile station 1 included in the original IP packet received, adds the PPP connection ID to the original IP packet, and transmits the resultant packet to the radio access network 2A under the control. The packet transmitted from the packet node 3A is transferred in the radio access network 2A in accordance with the PPP connection ID and is transmitted from the base station to the mobile station 1 as a destination.

The transmission data from the mobile station 1 to the host 4 is transmitted to the packet node 3A via the PPP connection between the mobile station 1 and the packet node 3A as an IP packet including the IP address of the host 4 as a destination address. The IP packet is transferred to the IP network 102 by the packet node 3A and is received by the host 4.

Figure 7:
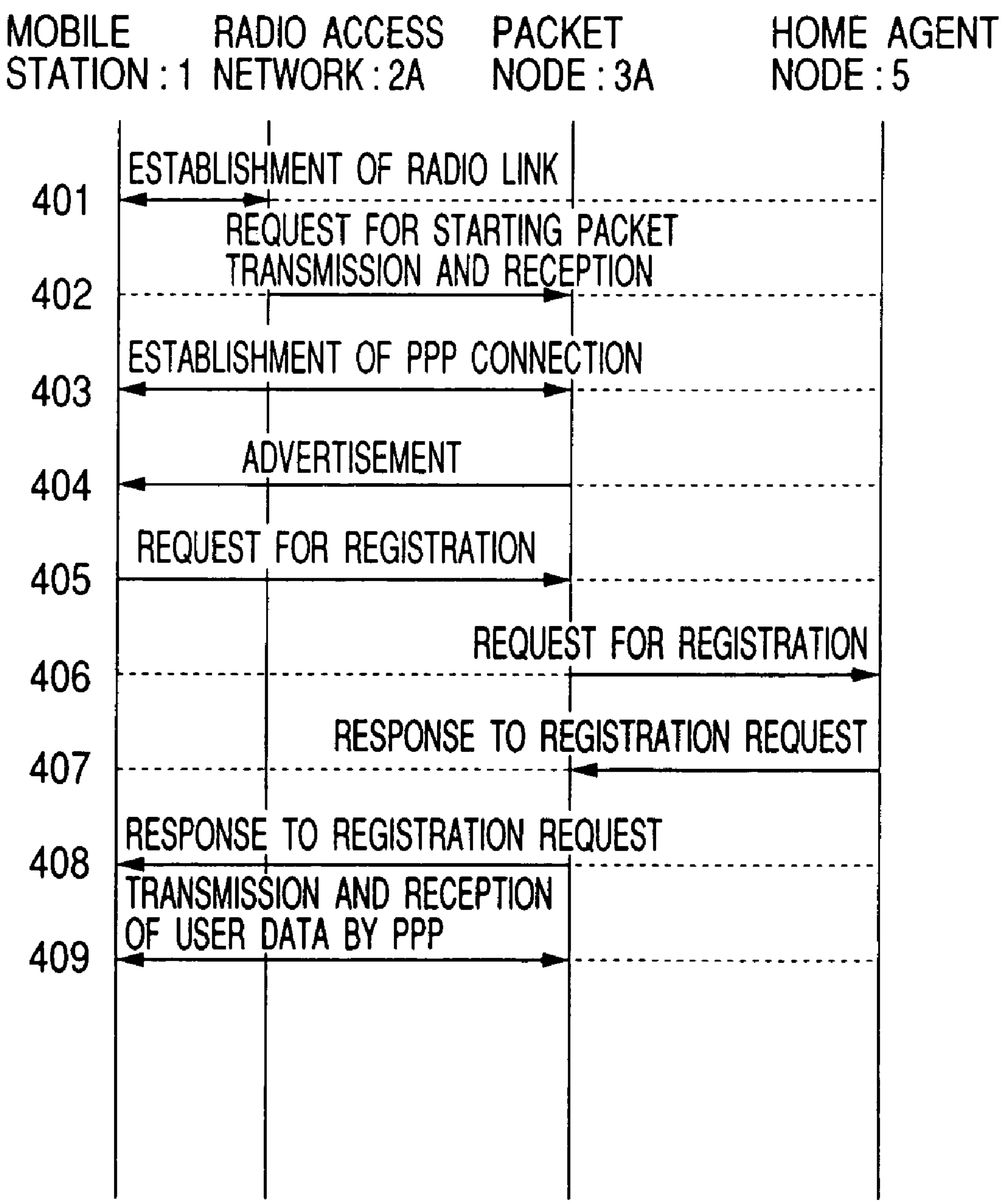
FIG. 7 is a diagram showing a registration procedure sequence in the conventional mobile IP network system.

FIG. 7 shows a sequence of a registration procedure in the conventional mobile IP network system.

In order to realize an IP packet transfer by the above-described mobile IP, it is necessary to register in the home agent node a packet node, between which and the mobile station the logical connection (PPP connection) is established, as a foreign agent node.

When a radio link is established between the mobile station 1 and the base station 6C in the area in which the mobile station 1 is positioned by the base station controller 7B in the radio access network 2A (step 401), a request for starting packet service (transmission and reception of packets) is sent from the base station controller 7B in the radio access network 2A to the packet node 3A (402), and a logical connection (PPP connection) is established between the packet node 3A and the mobile station 1 (403).

After the PPP connection is established, the packet node 3A notifies the mobile station 1 of the IP address of the packet node itself via the PPP connection (advertisement: 404). The mobile station 1 which has received the advertisement requests the packet node 3A for registration (405), and the packet node 3A transfers the registration request to the home agent node 5 of the mobile station 1 (406). The home agent node 5 which has received the registration request from the mobile station 1 registers the packet node 3A as a foreign agent corresponding to the mobile station 1 and then sends a registration response to the packet node 3A (407).

When the packet node 3A transfers the registration response to the mobile station 1 (408), the registration procedure is completed. By the procedure, the IP packet transmitted from the host 4 to the mobile station 1 is transferred from the home agent node 5 to the packet node 3A registered as a foreign agent, so that it can be transferred to the mobile station 1 via the PPP connection established between the packet node 3A and the mobile station 1 (409).

Figure 8:
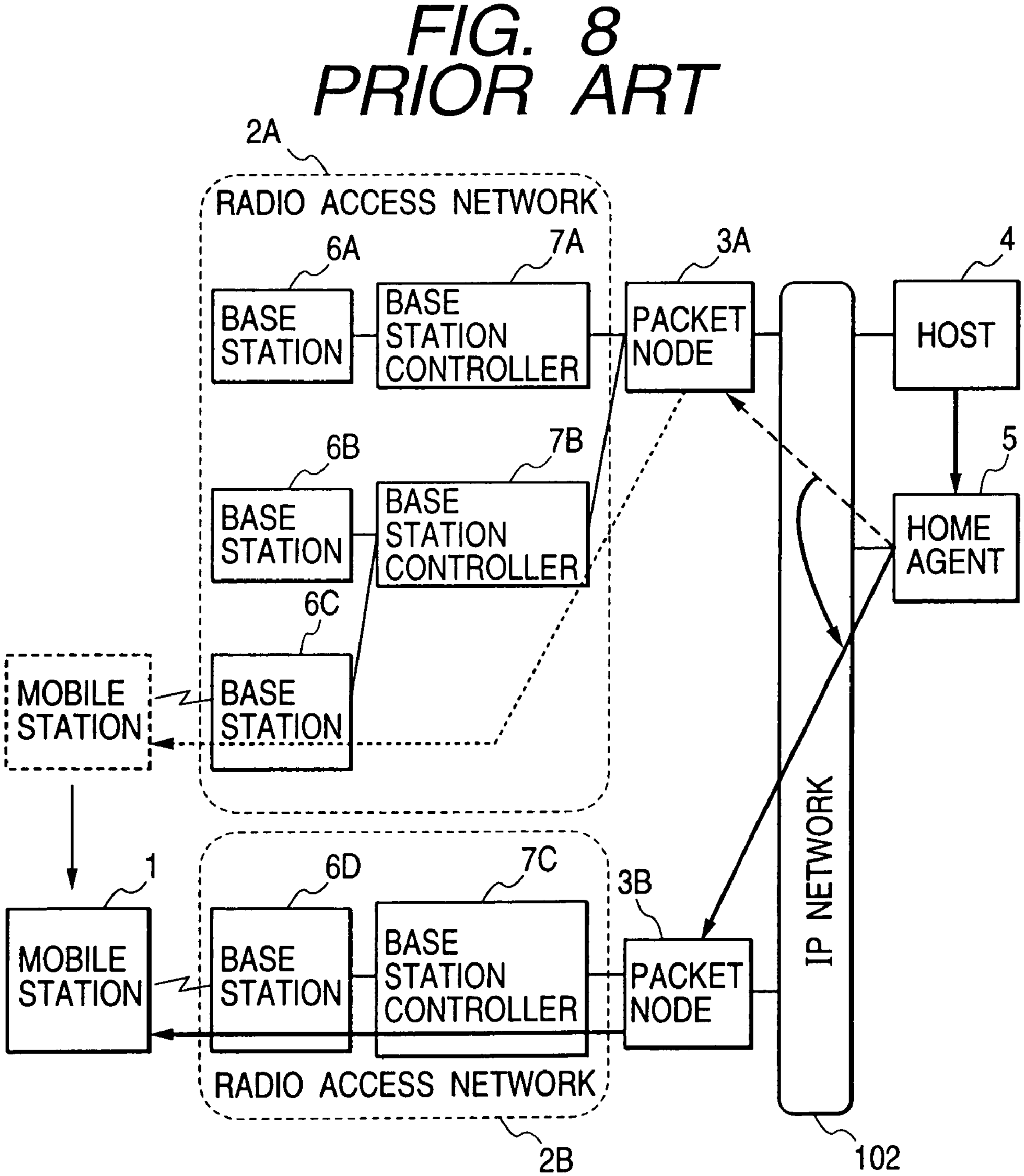
FIG. 8 is a diagram for explaining a change in a transfer route of an IP packet in the conventional mobile IP network system.

FIG. 8 shows a change in the IP packet transfer route in the conventional IP network system in association with a movement of the mobile station.

For example, when the mobile station 1 moves from the radio access network 2A as a control area of the packet node 3A to the radio access network 2B as a control area of the packet node 3B, as a result of hand-over between the base stations, the radio link established between the base station 6C in the radio access network 2A and the mobile station 1 and the logical connection (PPP connection) established between the mobile station 1 and the packet node 3A are released. In stead, a radio link between the base station 6D in the radio access network 2B and the mobile station 1 and a logical connection (PPP connection) between the mobile station 1 and the packet node 3B are established.

A registration procedure is executed in the radio access network 2B as a destination and the packet node 3B is registered as a new foreign agent of the mobile station 1. Consequently, the IP packet transmitted from the host 4 to the mobile station 1 is transferred from the home agent node 5 to the packet node 3B and is transferred from the packet node 3B to the mobile station 1 via the PPP connection as shown by arrows with solid lines.

Figure 9:
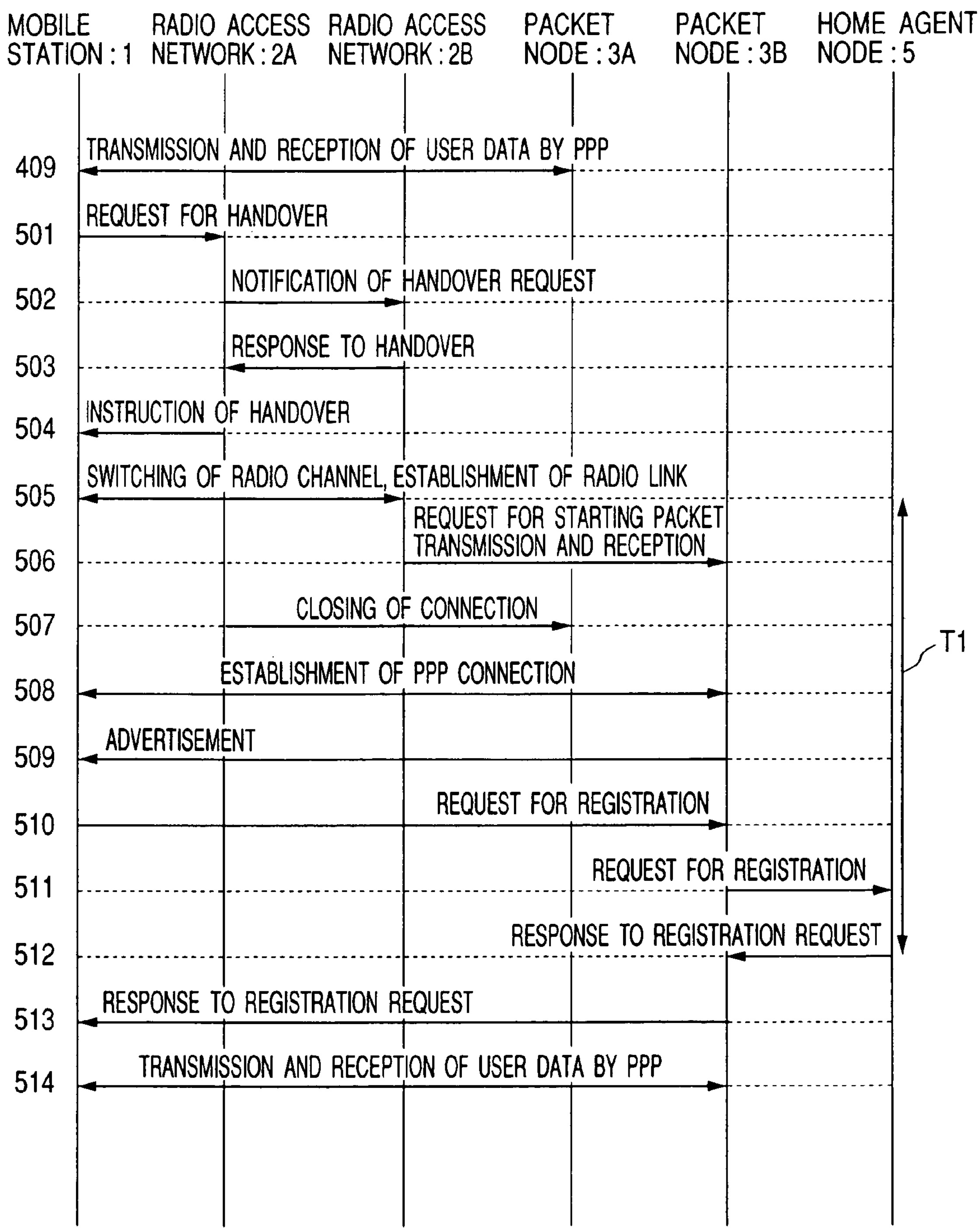
FIG. 9 is a processing sequence for changing a transfer route of an IP packet in the conventional mobile IP network system.

FIG. 9 shows a processing sequence for changing the IP packet transfer route in the conventional mobile IP network system.

When the mobile station 1 moves toward the control area of the radio access network 2B while performing communication with the host via the PPP connection with the packet node 3A (409), the mobile station 1 compares the reception strength of a control signal received from the base station 6C in the radio access network 2A shown in FIG. 8 with that of a control signal received from the base station 6D in the radio access network 2B. At a time point the reception strength from the base station 6D becomes stronger, a request of handover to the base station 6D is issued (501).

The handover request is notified from the base station controller 7B in the radio access network 2A to the base station controller 7C in the radio access network 2B via a control circuit connecting these base station controllers (502). If the base station 6D can accommodate the mobile station 1, the base station controller 7C returns a handover response to the base station controller 7B (503). When the base station controller 7B which has received the handover response instructs the handover to the mobile station 1 (504), the base station 6D as a destination allocates a radio channel to the mobile station 1, and a new radio link is established between the mobile station 1 and the radio access network 2B (505).

The base station controller 7C in the radio access network 2B establishes the logical connection between the mobile station 1 and the packet node 3B and requests to start transmission and reception of packets to and from the mobile station 1 (506). In parallel with this, the base station controller 7B in the radio access network 2A closes the logical connection established between the mobile station 1 and the packet node 3A (507). The packet node 3B which has received the request from the base station controller 7C establishes a logical connection (PPP connection) with the mobile station (508) and notifies the IP address of the packet node to the mobile station 1 (advertisement:509).

In response to reception of the advertisement, the mobile station 1 requests a registration of a foreign agent to the packet node 3B (510) and the packet node 3B transfers the registration request to the home agent node 5 (511). After registering the packet node 3B as a new foreign agent of the mobile station 1, the home agent node 5 transmits a registration response to the packet node 3B (512). When the registration response is transferred from the packet node 3B to the mobile station 1 (513), it is able to perform a packet communication via the PPP connection between the mobile station 1 and the packet node 3B (514).

As described above, in the conventional mobile IP network system, when a mobile station moves to the control area of another radio access network, in association with a handover of the mobile station between the base stations, the registration procedure for switching the foreign agent is executed. In this case, during a period (T1) since the mobile station is handed over to the destination radio access network until switching of the foreign agent is completed, the home agent node 5 keeps on transferring the IP packets destined to the mobile station 1 to the previous packet node 3A. The mobile station 1 cannot therefore receive the IP packets transmitted from the host during the period T1, so that a considerable amount of IP packets are dropped out.

With reference to FIGS. 10 to 18, the construction of the mobile IP network system according to the invention and the method of switching the connection will be described.

Figure 10:
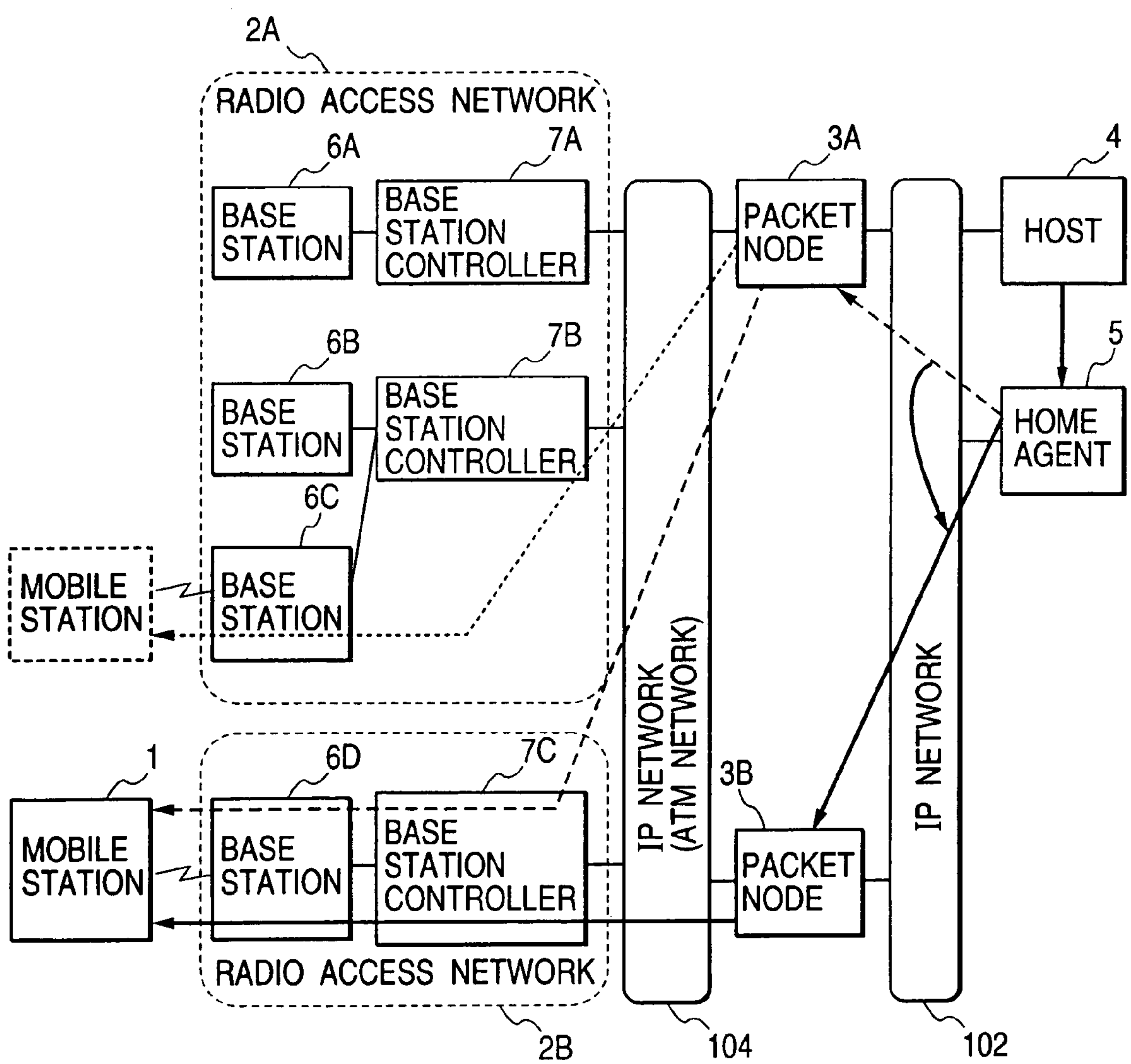
FIG. 10 is a diagram showing an example of the construction of a mobile IP network system according to the invention.

FIG. 10 shows an example of the construction of a mobile IP network system according to the invention.

The invention is characterized in that the plurality of packet nodes 3 (3A, 3B, . . . ) having the foreign agent function which are connected to the IP network 102 and the base station controllers 7 (7A, 7B, 7C, . . . ) in the radio access networks 2 are connected via a network 104 such as an ATM network.

In the conventional mobile IP network system, the packet node 3 and the base station controllers 7 have the connecting relation of 1 to m via the dedicated lines 101, and each of the base station controllers can communicate with the IP network only via a specific packet node coupled via a dedicated line. On the contrary, in the mobile IP network system of the invention, the packet nodes 3 and the base station controllers 7 have the connecting relation of k to m (k, m≧2) via the network 104. A logical connection can be selectively established between each of the base station controllers 7 and any of the packet nodes 3.

The present invention is characterized in that, for example, when the mobile station 1 which is performing the IP packet communication via the packet node 3A moves from the radio access network 2A to the radio access network 2B and is handed over from the base station 6C to the base station 6D, the base station controller 7C in the destination establishes a logical connection with the previous packet node 3A so that the mobile station 1 can continue the IP packet communication via the packet node 3A.

Figure 11A:
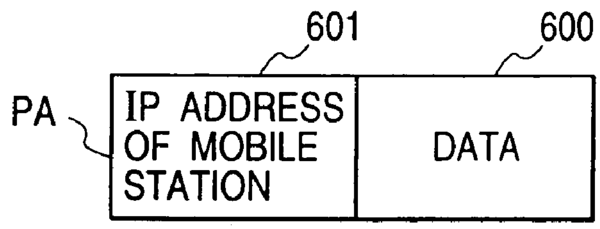
FIGS. 11A, 11B and 11C are diagrams showing formats of a transmission packet from a host to a mobile station, a transfer packet from a home agent node to a packet node, and a transfer packet from the packet node to a base station controller, respectively.
Figure 11B:
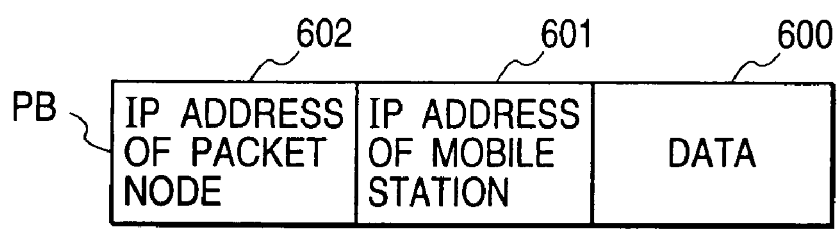
Figure 11C:
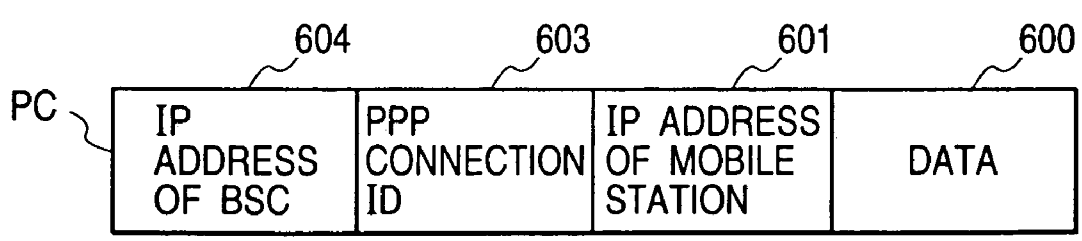

In the mobile IP network system, for example, as shown in FIG. 11A, the host 4 generates an IP packet PA in which an IP header including an IP address 601 of a destination mobile station is added to transmission data 600 destined for the mobile station 1 and transmits the IP packet PA to the home agent node 5 of the destination mobile station. A packet is transferred from the host 4 to the home agent node 5 in the form of, for example, an encapsulated packet obtained by adding the IP address of the home agent node as a destination IP address to the IP packet PA.

The home agent node 5 has a management table in which the IP address of a packet node in the radio access network in which each of the mobile stations is positioned at present is stored in correspondence with the IP address of a mobile station under the control. When a packet from the host 4 is received, the home agent node 5 refers to the management table on the basis of the IP address 601 of the destination mobile station included in the reception packet PA and retrieves the IP address of the packet node 3A to which the reception packet is transferred. The home agent node 5 adds an IP header including an IP address 602 of the packet node 3A as a destination address to the received IP packet PA and transmits the resultant as an encapsulated packet PB shown in FIG. 11B to the IP network 102.

The packet node has a management table in which the corresponding relations among the IP address of the mobile station which is performing communication via the PPP connection, the PPP connection ID, and the IP address of the base station controller related to the PPP connection. When a packet is received from the home agent node 5, the packet node decapsulates the reception packet PB, refers to the management table on the basis of the destination mobile station IP address 601 in the obtained IP packet PA, and retrieves the corresponding PPP connection ID and the IP address of the base station controller (BSC). The packet node 3A adds a header including a PPP connection ID 603 and an IP address 604 of the base station controller 7B as a destination address to the reception IP packet PA and transmits the resultant in the form of a packet PC shown in FIG. 11C to the network 104. When the network 104 is an ATM network, the packet PC is converted to a plurality of ATM cells to each of which a cell header including an ID (VPI/VCI) of the logical connection between the packet node 3A and the base station controller 7B is added and the resultant is transmitted to the network 104.

The base station controller 7B eliminates the IP address 604 from the reception packet PC and transfers the resultant packet to the base station 6C specified by the PPP connection ID 603. The base station 6C transfers the reception packet to the mobile station 1 via a radio link specified by the PPP connection ID 603. The mobile station 1 checks the destination IP address 601 of the reception packet and performs a process of receiving the IP packet destined to itself.

Figure 12:
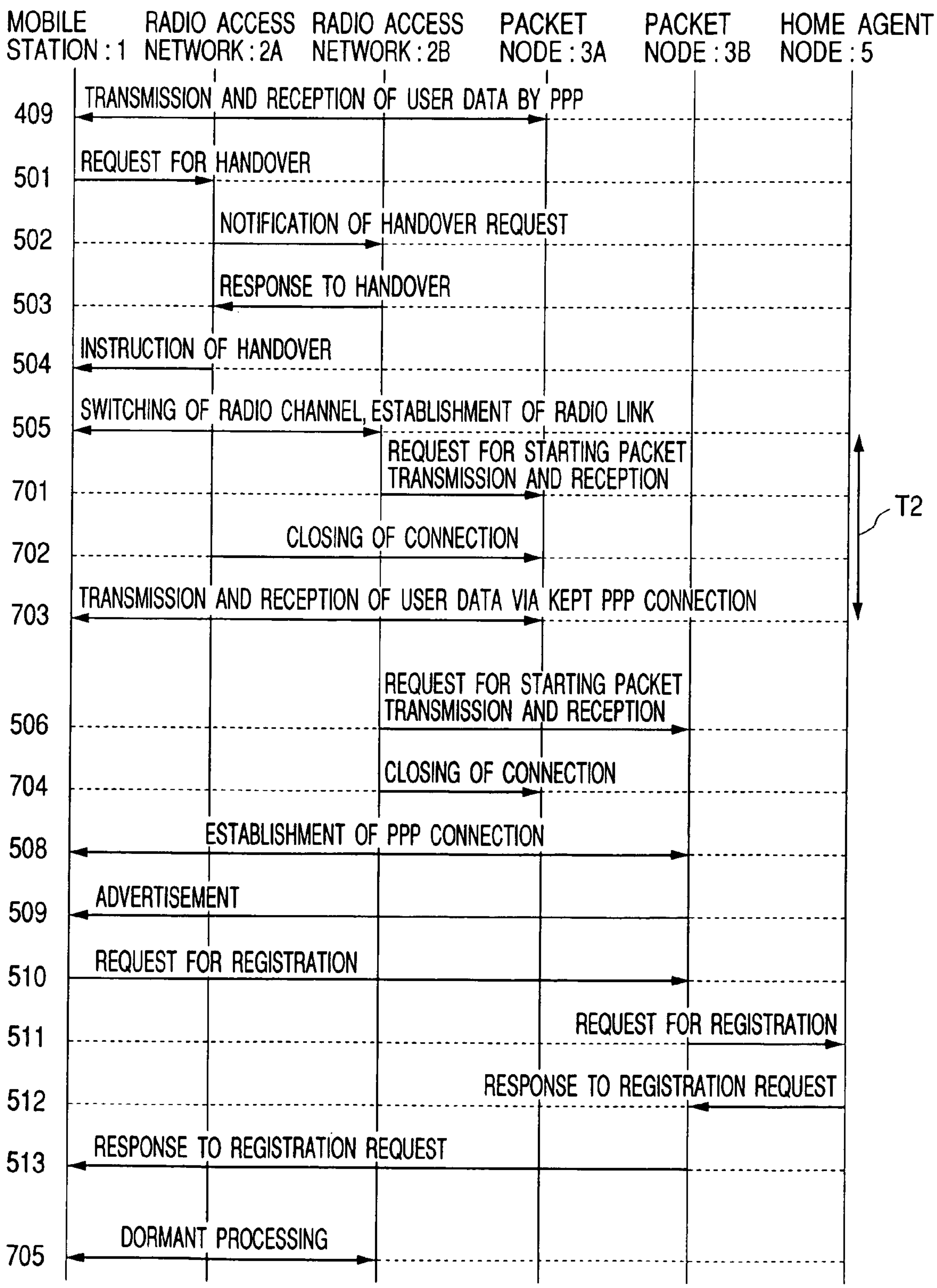
FIG. 12 is a diagram showing a processing sequence for changing a transfer route of an IP packet in a mobile IP network system of the invention.

FIG. 12 shows a processing sequence for changing the transfer route of the IP packet in the mobile IP network system of the invention. In FIG. 12, in order to make comparison with the conventional processing sequence described in FIG. 9 easier, the corresponding steps are designated by the same reference numerals. In the following, on the precondition that the mobile IP network system of FIG. 10 is used, description of the above sequence will be omitted here but the processing sequence for changing the IP packet transfer route in the invention will be described.

When the mobile station 1 which is PPP connected to the packet node 3A is moved to the control area of the radio access network 2B, a handover request is sent from the mobile station 1 to the base station controller 7B in the radio access network 2A (501), and a radio channel of the radio access network 2B is allocated to the mobile station 1 via handover procedures 502, 503 and 504 similar to the conventional handover procedures (505).

In the present invention, when the base station controller 7B in the radio access network 2A which has received the handover request (501) from the mobile station 1 notifies the handover request to the base station controller 7C in the radio access network 2B, the ID of the packet node 3A to which the mobile station 1 is presently PPP connected is also notified to the base station controller 7C (502).

The base station 6C itself may send the handover request (501) with respect to the mobile station 1 to the base station controller 7B when the base station 6C detects that the strength of the received radio wave from the mobile station 1 which is performing communications drops below a predetermined level. It is also possible that the mobile station 1 issues a handover request to the base station controller 7C via the destination base station 6D and the base station controller 7C instructs handover to the mobile station 1. In this case, the base station controller 7C has to be notified of the ID of the base station controller 7B, which is being connected from the mobile station 1, to inquire the base station controller 7B of the ID of the packet node which is PPP connected to the mobile station 1.

When a radio link is established between the mobile station 1 and the destination base station 6D (505), in the conventional system, the base station controller 7C connected to the base station 6D sends a request of the packet transmission and reception to and from the mobile station 1 to the specific packet node 3B preliminarily designated (506) and a new logical connection (PPP connection) to communication with the mobile station 1 is established (508). In contrast, in the invention, the base station controller 7C sends the request of packet transmission and reception to and from the mobile station 1 to the previous packet node 3A to which the mobile station 1 is PPP connected at the time of handover (701). The packet node 3A changes the destination address 604 to the IP address of the base station controller 7C as a request source in a state where the PPP connection to the mobile station 1 is maintained, and transfers the IP packet destined to the mobile station 1 to the base station controller 7C. When an ATM network is used as the network 104, a preset PVC (Permanent Virtual Connection) can be used for the packet communication between the base station controller and the packet node.

In parallel with the operation of the base station controller 7C, the base station controller 7B closes the logical connection for the mobile station 1 between the base station controller 7B and the packet node 3A (702). In this case, since the connecting relation between the mobile station 1 and the packet node 3A is unchanged, the registration procedure of the foreign agent node is unnecessary and communication interruption time T2 in the destination radio access network 2B is extremely short.

In the invention, each of the base station controllers monitors a transmitting and receiving state of the IP packet for each mobile station under control, confirms that the transmission and reception of the IP packet to and from the mobile station is ceased, and executes the registration procedure. For example, the base station controller 7C is provided with a data flow monitoring timer for repeating measurement of elapsed time each time the IP packet is transmitted and received to and from the mobile station 1. When the data flow timer times out, it is determined that the transmission and reception of the IP packet is ceased. A request of starting packet service (packet transmission and reception) is sent to a specific packet node (in this example, the packet node 3B) which is preliminarily designated for each base station controller (506) and the logical connection related to the mobile station 1 with the packet node 3A which has been performing communications is closed (704). By the operation, the logical connection (PPP connection) between the mobile station 1 and the packet node 3B is established (508) and a registration is executed by a procedure (509 to 513) similar to the conventional one.

In order to shorten the time required for the registration, for example, it is also possible that, at the time point a handover request is received (502), the base station controller 7C requests the specific packet node 3B to set a temporary logical connection and, when the data flow monitoring timer times out, an advertisement request is issued to the mobile station 1. It is also possible to restart the data flow monitoring timer by the base station controller 7C after completion of the registration procedure and, when the timer times out again, a dormant processing (705) for releasing the radio channel allocated to the mobile station 1 may be executed in order to effectively use the radio channel.

Figure 13:
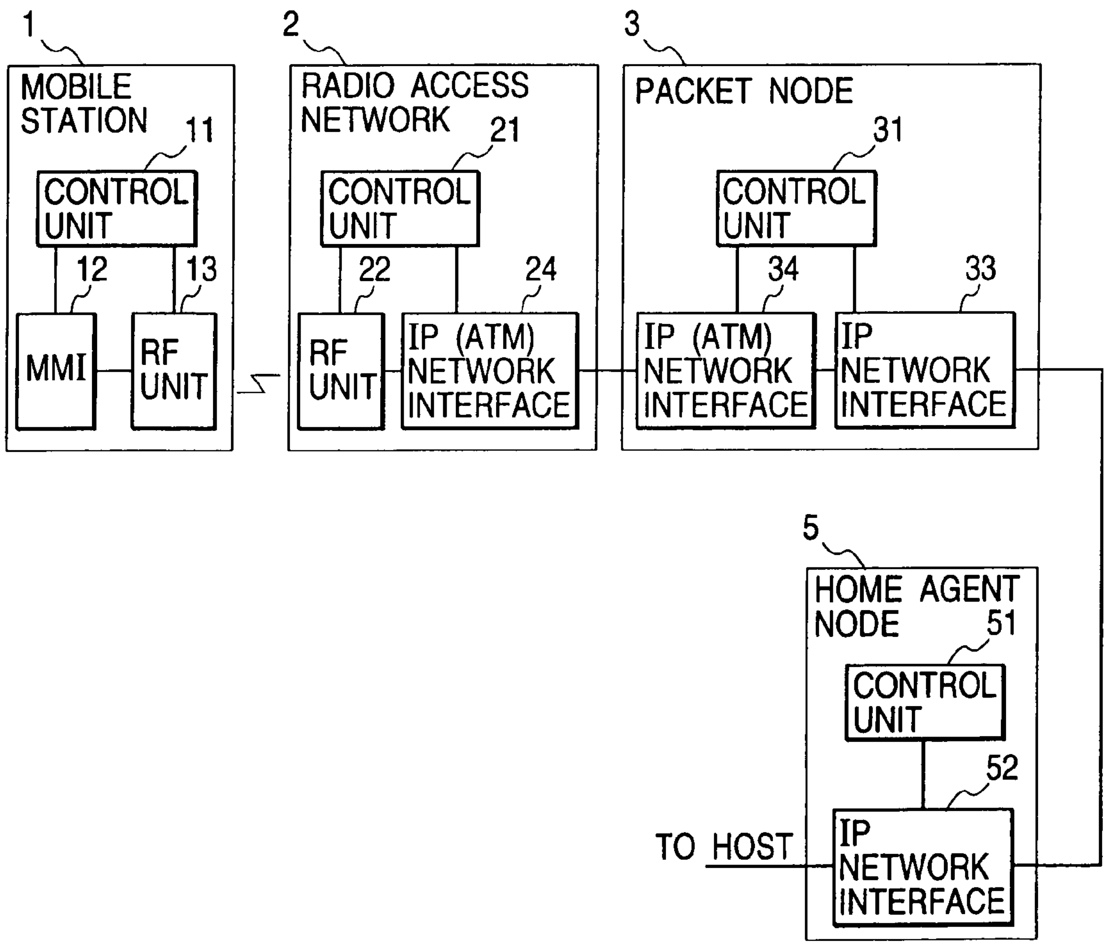
FIG. 13 is a block diagram showing schematic constructions of a mobile station 1, a radio access network 2, a packet node 3 and a home agent node 5 constructing a mobile IP network system of the invention.

FIG. 13 shows schematic constructions of the mobile station 1, radio access network 2, packet node 3 and home agent node 5 which construct the mobile IP network system of the invention.

The difference from the conventional system shown in FIG. 3 is that the radio access network 2 and the packet node 3 have interfaces (IP network interfaces: ATM network interfaces) 24 and 34 for connection to the common network 104 in place of the dedicated line interfaces 23 and 32.

Figure 14:
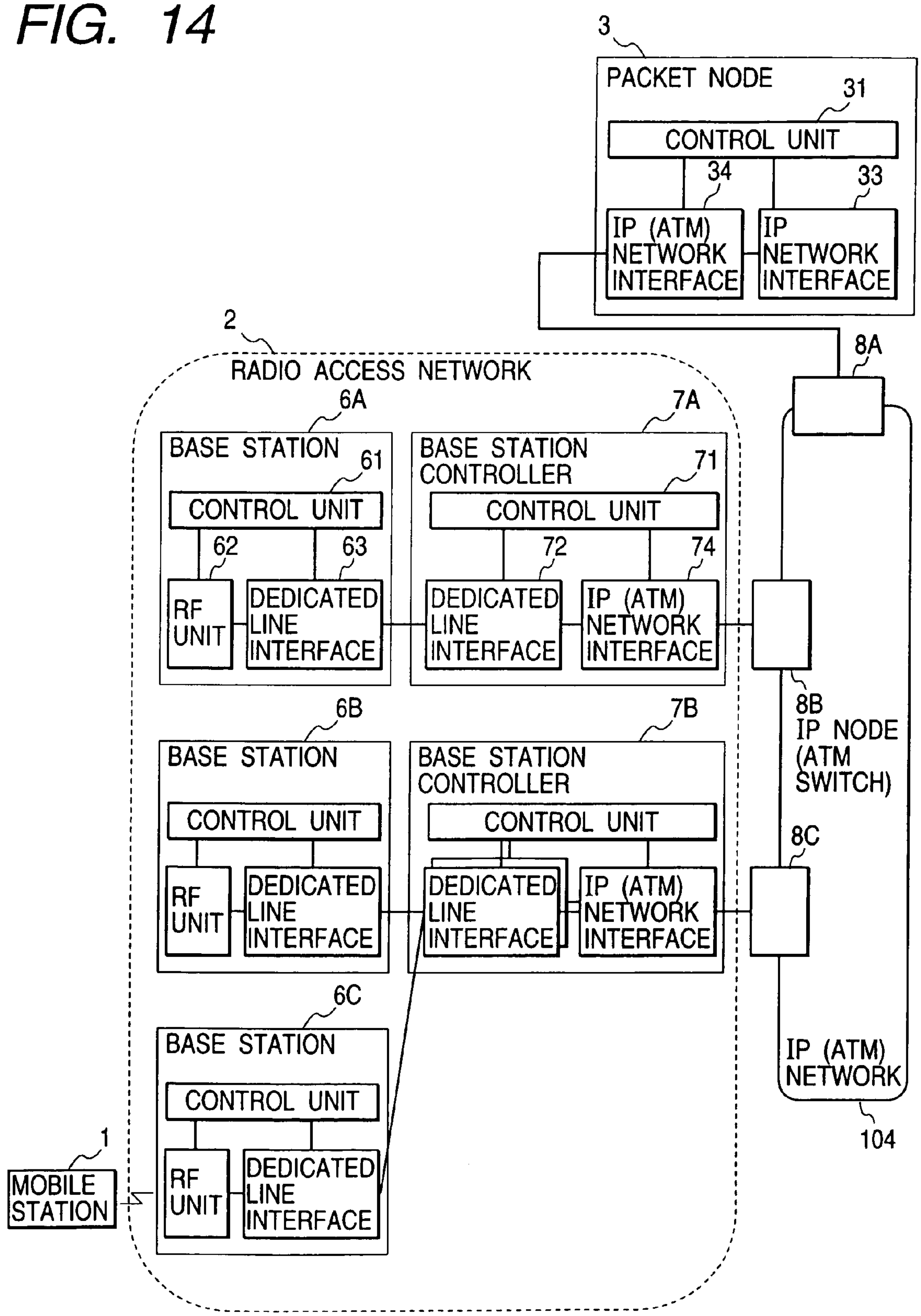
FIG. 14 is a diagram specifically showing the radio access network 2 in the invention.

FIG. 14 specifically shows the construction of the radio access network 2.

Each of the base station controllers 7 (7A and 7B) in the radio access network 2 has a line interface (IP network interface: ATM network interface) 74 for connection to the common network 104 in place of the dedicated line interface 73 for communicating with the packet node 3. The common network 104 is an IP network such as an ATM network and includes IP nodes (ATM switches) 8A, 8B, 8C, . . . for accommodating the plurality of base station controllers 7 and the plurality of packet nodes 3.

Figures 15, 16:
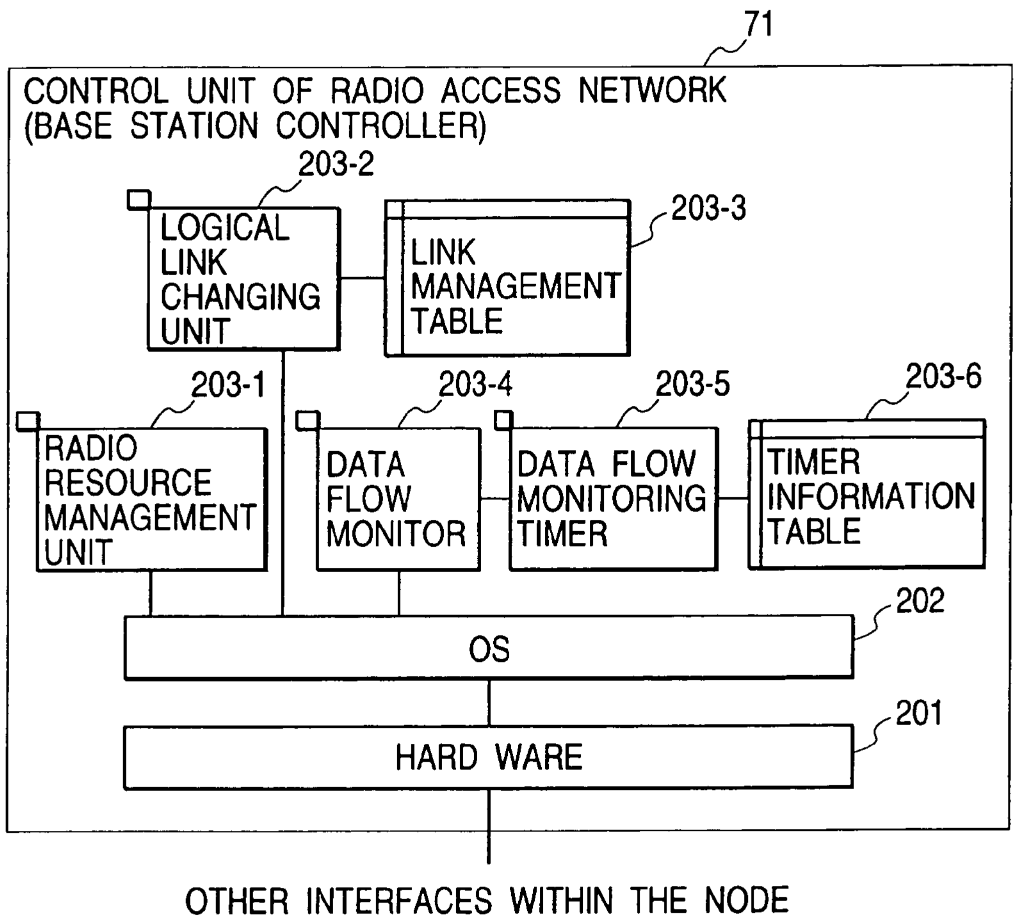
FIG. 15 is a diagram showing the construction of a control unit 71 in a radio access network of the invention.
FIG. 16 is a diagram showing the construction of a link management table 203-3 in FIG. 15.

FIG. 15 shows an embodiment of the control unit 71 in the base station controller in each of the radio access networks.

The control unit 71 in the base station controller comprises: hardware 201 such as a CPU and a memory, a real-time OS 202, and an application 203 which operates under the control of the OS. The application has not only a radio resource management unit 203-1 but also, for each of the mobile stations under the control, a data flow monitor 203-4 for monitoring the flow of transmission and reception data, a data flow monitoring timer 203-5 for measuring time in which the data transmission and reception to and from each of the mobile stations is ceased on the basis of the result of the monitoring of the data flow monitor, a timer information table 203-6 for storing data such as a time-out value required by the data flow monitoring timer, a link management table 203-3 for memorizing a packet node which is PPP connected at present for each mobile station under the control, and a logical connection changing unit 203-2 for controlling the switching of the logical connection (PPP connection) on the basis of the link management table.

The link management table 203-3 stores, for example as shown in FIG. 16, the relations among an ID 301 of a mobile station under the control of the base station controller 7, an ID 302 of a packet node to which the mobile station is PPP connected at present, and an ID 303 of a preliminarily designated specific packet node. As the ID 303 of the specific packet node, a packet node having the shortest connecting path with the base station controller 7 is registered.

Figure 17:
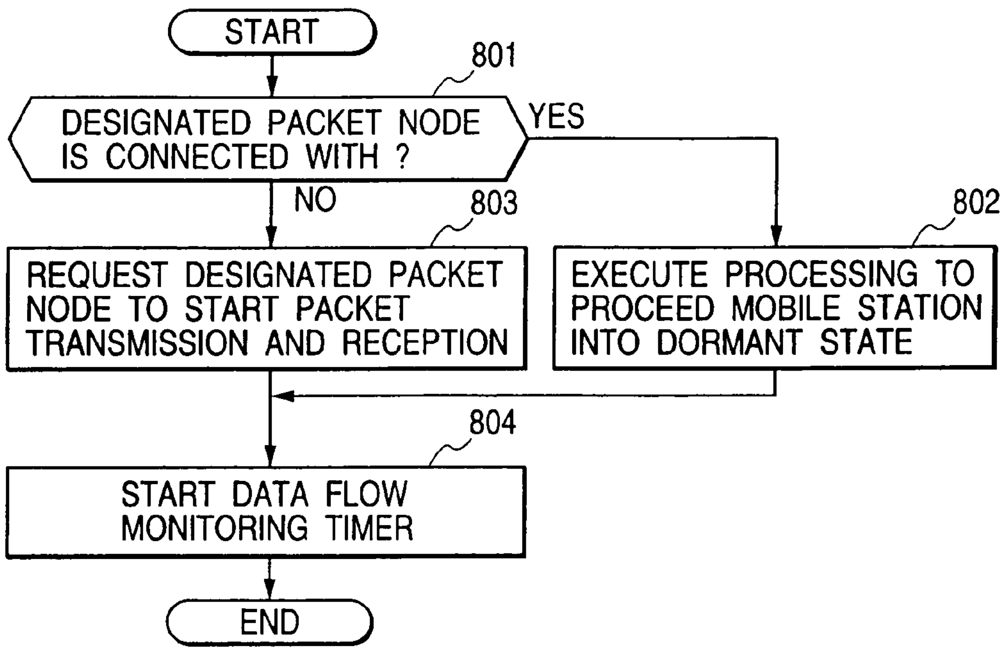
FIG. 17 is a flowchart showing an example of processing operations of a logical link changing unit 203-2 in FIG. 15.

FIG. 17 shows processes of the logical link changing unit 203-2 executed by the control unit 71 in the base station controller 7 when the data flow monitoring timer 203-5 times out.

When the data transmission and reception of a certain mobile station is stopped for predetermined time or longer and the data flow monitoring timer 203-5 times out, the logical link changing unit 203-2 refers to the link management table 203-3 and compares the packet node 302 in connection and the designated packet node 303, corresponding to the mobile station, thereby determining whether or not the mobile station is PPP connected to the preliminarily designated specific packet node (step 801).

In the case where the mobile station is PPP connected to the preliminarily designated packet node, the routine advances to a dormant mode and the radio channel allocated to the mobile station is released (802). The data flow monitoring timer is started again and the process is terminated (804). If the mobile station is PPP connected to a packet node except for the designated packet node, a request for starting the transmission and reception of packets to and from the mobile station is issued to the designated packet node in order to PPP connect the mobile station to the designated packet node. After the ID of the designated packet node is registered in the packet node in connection field 302 (803), the data flow monitoring timer is started again and the process is terminated (804).

Figure 18:
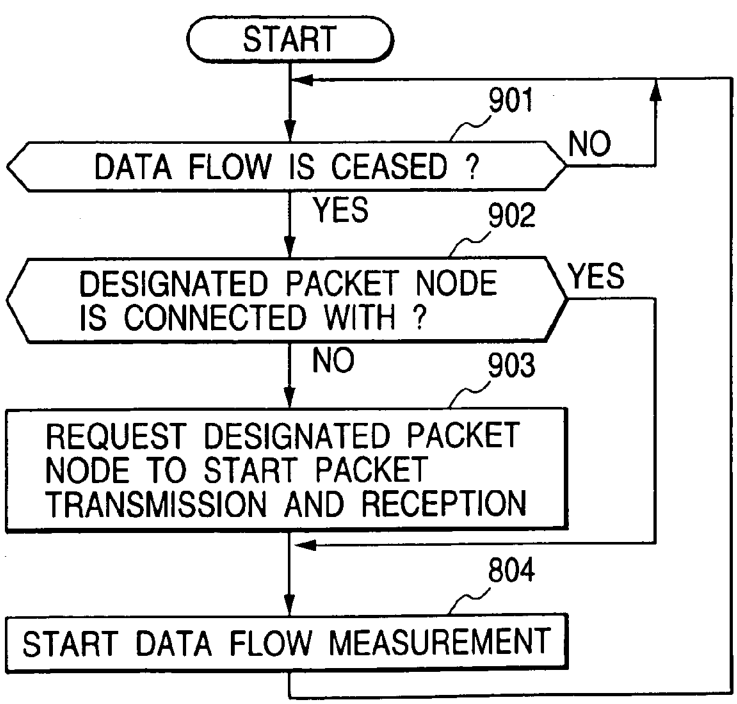
FIG. 18 is a flowchart showing another example of processing operations of the logical link changing unit 203-2 in FIG. 15.

FIG. 18 shows the processing operation of the logical link changing unit 203-2 in the base station controller 7 in the radio access network 2 which does not have the dormant processing function.

The logical link changing unit 203-2 waits for a time-out signal from the data flow monitor 203-4 (901). When the time-out signal is received, that is, it is detected that the data transmission and reception of a certain mobile station is ceased for predetermined time or longer, it is determined, by referring to the link management table 203-3, whether or not the mobile station is PPP connected to the specific packet node preliminarily designated in the self base station controller (902).

When the mobile station is PPP connected to the designated packet node, measurement of the data flow is started again (904). When the mobile station is PPP connected to a packet node other than the designated packet node, in order to PPP connect the mobile station to the designated packet node, a request for starting the transmission and reception of a packet to and from the mobile station is sent to the designated packet node and the ID of the designated packet node is registered in the field 302 of the packet node in connection (903). After that, the measurement of the data flow is started again (904).

As obviously understood from the embodiment, the invention is characterized in that the plurality of packet nodes 3 connected to the IP network 102 and a plurality of base station controllers 7 in the radio access network 2 are connected to each other via the network 104, and each of the base station controllers can selectively connect the mobile station handed over from another radio access network to any of the packet nodes.

In the embodiment shown in FIG. 10, the network 104 for connecting the packet node 3 and the base station controller to each other and the IP network 102 to which the home agent node is connected are separate networks. In order to achieve the object of the invention, however, the network 104 may be a part of the IP network 102. That is, the following manner may be also used in which each of the base station controllers 7 is connected to the IP network 102 and, for example, the packet node 3A transfers an IP packet, which is transferred from the home agent 5 to the packet node 3A via the IP network 102, to the base station controller 7B or 7C via the IP network 102.

As obviously understood from the foregoing embodiment, according to the invention, a logical connection can be selectively established between each of the base station controllers in the radio access network and an arbitrary packet node having the foreign agent function. Consequently, when a mobile station is handed over from one radio access network to another radio access network, without switching the foreign agent node in the destination radio access network, the mobile station can be logically connected to the previous packet node and the IP packet communication can be continued. The mobile IP packet communication which avoids dropout of packets during execution of the registration for switching the foreign agent node can be therefore performed.

According to the invention, since the registration of the foreign agent node is executed during the period in which the IP packet transmission and reception is ceased, even when the foreign agent node is switched to the optimum packet terminal in association with the movement of the mobile station, dropout of packets during the registration period can be avoided.

What is claimed is:

1. A mobile IP network system comprising:

a plurality of radio access networks each connected to mobile stations via radio links; and an IP network to which a home agent node and a plurality of packet nodes each for transferring IP packets destined for one of mobile stations and received from the home agent node to one of said radio access networks are connected, wherein each of the radio access networks has at least one base station controller and at least one radio base station which is connected to the base station controller to perform radio communications with a plurality of mobile stations, and wherein each of the base station controllers is connected to the plurality of packet nodes through a network, receives an identifier of a previous packet node from another base station controller when one of the mobile stations moved into a control area of the base station controller from a control area of the another base station controller belonging to another radio access network, and selects either the previous packet node which is communicating IP packets for the moved mobile station with said home agent node or a preliminarily designated specific packet node in accordance with a communication state of the mobile station, thereby to selectively carry out IP packet communication for the moved mobile station between the base station controller and the previous packet node using a previous identifier of a logical connection having been established between the previous packet node and the mobile station or IP packet communication between the base station controller and the specific packet node using an identifier of a new logical connection established between the specific packet node and the moved mobile station, after performing a registration procedure between the moved mobile station and said home agent node, depending on the communication state of the mobile station.

2. A mobile IP network system according to claim 1, wherein each of said base station controllers selects, with respect to the mobile station moved from the control area of said another base station controller to the control area of the base station controller, said previous packet node when the moved mobile station is in a state of communicating IP packets with the previous packet node and requests the previous packet node to communicate IP packets for the moved mobile station with the base station controller.

3. A mobile IP network system according to claim 2, wherein each of said base station controllers has means for monitoring communication packets of the mobile station which has moved from the control area of said another base station controller, thereby to close the communication between the base station controller and the previous packet node, and to establish the new logical connection between the moved mobile station and said specific packet node via the base station controller, upon detecting that data transmission and reception of the moved mobile station is ceased.

4. A mobile IP network system according to claim 1, wherein each of said packet nodes has a foreign agent function for transferring an IP packet received from the home agent node connected to the IP network to any of the base station controllers.

5. A mobile IP network system comprising:

a plurality of radio access networks each connected to mobile stations via radio links; and an IP network to which a plurality of packet nodes for transferring IP packets are connected, wherein each of the radio access networks has at least one base station controller and at least one radio base station which is connected to base station controller to perform radio communications with a plurality of mobile stations, wherein each of the base station controllers, in the radio access network is connected to the plurality of packet nodes through a network, receives an identifier of a previous packet node from another base station control when one of the mobile stations moved into a control area of the base station controller from a control area of the another base station controller, and selects either the previous packet node of a preliminarily designated specific packet node in accordance with a communication state of the moved mobile station, thereby to selectively carry out IP packet communication for the moved mobile stations using a previous identifier of a logical connection having been established between the previous packet node and the moved mobile station or an identifier of a new logical connection established between the specific packet node and the moved mobile station depending on the communication state of the moved mobile station, wherein each of said base station controllers selects, with respect to the moved mobile station moved from the control area of said another radio access network to the control area of the base station controller, said previous packet node when the moved mobile station is in a state of communicating IP packets with the previous packet node and the requests the previous packet node to communicate IP packets for the mobile station with the base station controller, wherein each of said base station controllers has means for monitoring communication packets of the moved mobile station which has moved from the control area of said another base station controller, thereby to close the communication between the base station controller and the previous packet node, and to establish the new logical connection between the moved mobile station and said specific packet node via the base station controller, upon detecting that the data transmission and reception of the moved mobile station is ceased, and wherein said specific packet node has means for notifying to a home agent node of the moved mobile station which is connected to the IP network that the mobile station is in a control area of the specific packet node after setting of the new logical connection for the moved mobile station so that the home agent node having received the notification transfers IP packets, which are destined for the moved mobile station and received thereafter from the IP network, to the specific packet node.

6. A method of switching a connection for communication between a mobile station connected to any of a plurality of radio access networks via a radio link and a plurality of packet nodes connected to an IP network, comprising:

a step of establishing a first logical connection to be used for IP packet communication between a mobile station connected to a first radio access network and a first packet node which is preliminarily related with the first radio access network;

a step of transferring, by said first packet node, IP packets for the mobile station which are received from a home agent node of the mobile station, to the first radio access network using an identifier of the first logical connection;

a step of connecting the mobile station to a second radio access network adjacent to the first radio access network when the mobile station moves into an area of the second radio access network; and a step of requesting from the second radio access network to the first packet node to communicate IP packets for the mobile station with the second radio access network while maintaining the first logical connection, wherein IP packets are communicated between the mobile station and the first packet node using the identifier of the first logical connection via the second radio access network without performing a registration procedure between the mobile station and said home agent node until communication of IP packets for the mobile station is ceased.

7. A connection switching method according to claim 6, further comprising:

a step of closing, upon detecting that data transmission and reception ceased, the first logical connection and establishing a new logical connection to be used for IP packet communication between the mobile station and a second packet node via the second radio access network, said second packet node being preliminarily related with the second radio access network.

8. A base station controller for a radio access network for transmitting and receiving an IP packet to and from a packet node which is connected to an IP network and has a foreign agent function for transferring IP packets from a home agent node to mobile stations, comprising:

a first communication interface for connection to a radio base station, a second communication interface for communication with a plurality of packet nodes connected to the IP network, and a control unit connected to the first and second communication interfaces, wherein the control unit selectively establishes a logical connection to be used for an IP packet communication of a mobile station moved into a control area of the base station controller to established a new logical connection to be used for IP packet communication between the base station and the packet node or to transfer IP packets for the mobile station to the base station controller using a previous identifier of a logical connection having been used when the mobile station was connected to another radio access network, via the second interface;

wherein said control unit has means for selecting, when the mobile station has moved into the control area of the base station controller from said another radio access network, a first packet node which is communicating with the mobile station in the another radio access network, to request the first packet node to transfer IP packets for the mobile station to the base station controller using said previous identifier of the logical connection having been used in the another radio access network;

wherein said control unit comprises:

means for monitoring communication packets for the mobile station which is communicating with said first packet node; and means for switching a first logical connection having been established between the mobile station and the first packet node to another new logical connection which is established between the mobile station and a second packet node preliminarily related to the base station controller when it is detected by the monitoring means that the transmission of communication packets for the mobile station is stopped;

wherein establishing said another new logical connection after performing a registration procedure between the moved mobile station and said home agent node.

9. A base station controller according to claim 8, wherein said control unit has means for notifying the base station controller in adjacent one of the other radio access networks of identification information of a previous packet node which has been communicating with the mobile station when the mobile station moved out from the control area of the base station controller to a control area of the adjacent radio access network.

10. A base station controller for a radio access network for communicating IP packets with one of packet nodes each of which is connected to an IP network and has a foreign agent function, comprising:

a first communication interface for connection the base station controller to a radio base station, a second communication interface for communication with a plurality of packet nodes connected to the IP network, and a control unit connected to the first and second communication interfaces, wherein the control unit selectively requests one of the packet nodes selected in accordance with a communication state of a mobile station connected to the radio base station via a radio channel to establish a new logical connection to be used for IP packet communication between the mobile station and the packet node or to transfer IP packets for the mobile station to the base station controller using a previous identifier of a logical connection having been established between a mobile station and the packet node, via the second interface, wherein said control unit comprises:

means for selecting, when a mobile station has moved into a control area of the base station controller from another radio access network, a first packet node which has been communicating with the moved mobile station in the another radio access network, to request the first packet node to transfer IP packets for the moved mobile station to the base station controller using said previous identifier of the logical connection having been established, means for monitoring communication packets for the moved mobile station which is communicating with said first packet node, and means for switching a first logical connection having been established between the moved mobile station and the first packet node to a logical connection which is established between the moved mobile station and a second packet node preliminarily related to the base station controller when it is detected by the monitoring means that the transmission of communication packets for the moved mobile station is stopped, and wherein said second communication interface is connected to a communication network for connecting the plurality of packet nodes, and said switching means closes the first logical connection by requesting said first packet node to communicate IP packets for said the moved mobile station with the base station controller and establishes said second logical connection by requesting said second packet node to communicate IP packets for the moved mobile station with the base station controller, when said monitoring means detects that the transmission of communication packets has stopped.

* * * * *